(12) United States Patent
Liu et al.

(10) Patent No.: US 8,604,829 B2
(45) Date of Patent: Dec. 10, 2013

(54) LOW-POWER WIDE-TUNING RANGE COMMON-MODE DRIVER FOR SERIAL INTERFACE TRANSMITTERS

(75) Inventors: Xin Liu, El Dorado Hills, CA (US); Arvind Bomdica, Fremont, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 13/227,250

(22) Filed: Sep. 7, 2011

(65) Prior Publication Data
US 2013/0057320 A1 Mar. 7, 2013

(51) Int. Cl.
*H03K 17/16* (2006.01)

(52) U.S. Cl.
USPC .............................. 326/82; 326/27

(58) Field of Classification Search
USPC .................. 326/21, 26, 27, 83–87
See application file for complete search history.

(56) References Cited

U.S. PATENT DOCUMENTS

| | | | |
|---|---|---|---|
| 7,069,455 B2 * | 6/2006 | Muljono et al. ............. 713/320 |
| 7,355,449 B1 * | 4/2008 | Tran et al. ...................... 326/82 |
| 7,579,874 B2 * | 8/2009 | Chen et al. ...................... 326/83 |
| 7,609,091 B2 * | 10/2009 | Muljono et al. ................ 326/82 |
| 7,795,919 B2 * | 9/2010 | Fujiwara ......................... 326/87 |
| 8,115,515 B2 * | 2/2012 | Roper ............................. 326/83 |
| 8,125,245 B2 * | 2/2012 | Flynn et al. .................... 326/87 |
| 2009/0033367 A1 * | 2/2009 | Shiraishi et al. ............... 326/87 |
| 2009/0153219 A1 * | 6/2009 | Wu et al. ...................... 327/333 |

* cited by examiner

*Primary Examiner* — Don Le
(74) *Attorney, Agent, or Firm* — Williams, Morgan & Amerson, P.C.

(57) ABSTRACT

A method is provided for controlling a data transmission device. The method includes providing a reference voltage to the common mode driver and putting the data transmission device in a low power state. The method also includes driving a differential signal pair output from the common mode driver during a portion of the low power state. Also provided is a device that includes a data output driver portion configured to drive an output signal at a common mode voltage and a data output driver portion configured to drive an output signal at a differential voltage level during at least a portion of time when the device is not in a low power state. Also provided is a computer readable storage device encoded with data for adapting a manufacturing facility to create the device. Also provided is an apparatus configured to perform the method.

19 Claims, 10 Drawing Sheets

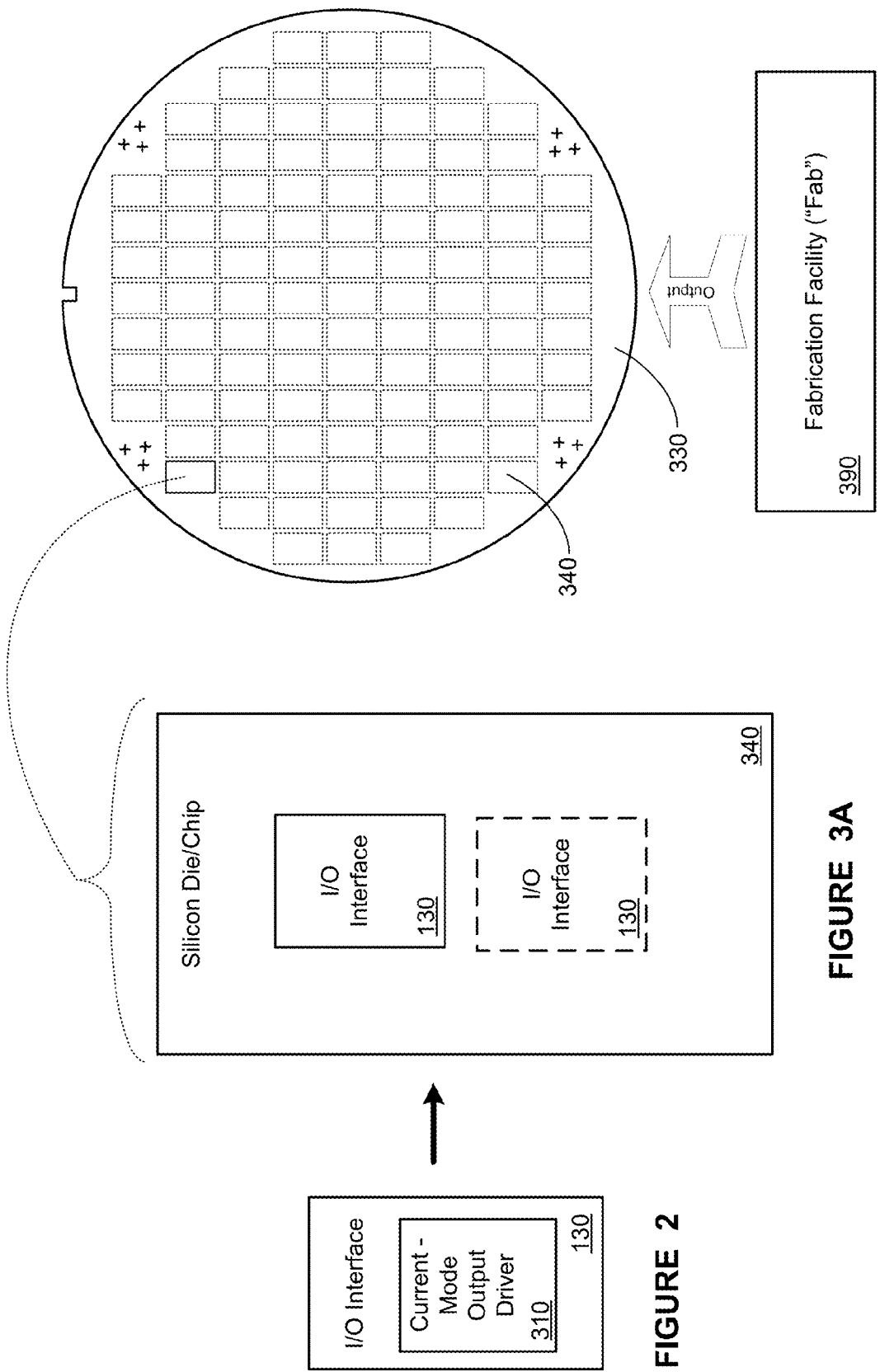

LOW-POWER WIDE-TUNING RANGE COMMON-MODE DRIVER FOR SERIAL INTERFACE TRANSMITTERS

BACKGROUND

1. Field of the Invention

Embodiments of this application relate generally to electrical circuits and input/output ("I/O") interfaces, and, more particularly, to a method and circuit for a low-power wide-tuning range current-mode logic ("CML") output drivers for serial interfaces.

2. Description of Related Art

Electrical circuits and data storage devices have evolved becoming faster and transmitting greater amounts of data. With the increased speed and bandwidth capabilities of electrical circuits and data storage devices, I/O interfaces must be adapted to be compatible with new product, system and technology requirements. As technologies for electrical circuits, communications and data storage devices have progressed, there has developed a greater need for efficiency, reliability and stability, particularly in the area of I/O interfaces and serial I/O interfaces. However, voltage, current and signal speed considerations introduce substantial barriers to operational efficiency. Efficient operation in a low-power mode while maintaining a common-mode voltage ($V_{CM}$) is particularly problematic.

Typically, in modern implementations for I/O interfaces, either a voltage divider is used, or part of the CML output driver circuit remains enabled, to maintain an output voltage in a low-power mode. However, using either of these approaches is inadequate to provide required efficiency while maintaining a common-mode voltage, especially in view of PVT corners. That is, variations in I/O interfaces and CML circuits due to PVT corners cause low yield and inadequate performance/efficiency using state of the art solutions. Voltage dividers are inherently inefficient as they consume power when in use. Voltage dividers are weak in terms of their ability to drive current. This causes large common-mode voltage ($V_{CM}$) errors due to leakage current. Voltage dividers also lack the ability to control common-mode voltages ($V_{CM}$) that vary in a wide range. Partially operating CML output driver circuits dissipate power by maintaining operation of a portion of the circuit in order to pull up the data inputs to the circuit operating voltage (e.g., a VDD node of the circuit). Partially operating CML output driver circuits also require their bias circuits to remain powered on (and/or enabled) and operational. The power dissipation of such circuits may consume in excess of 3 mA at a 1.0V peak-to-peak differential output voltage.

Embodiments presented herein eliminate or alleviate the problems inherent in the state of the art described above.

SUMMARY OF EMBODIMENTS

In one aspect of the present invention, a method for controlling a data transmission device that includes a bias circuit, a common mode driver and an output driver circuit is provided. The method includes providing a reference voltage to the common mode driver and putting the data transmission device in a low power state. The method also includes driving a differential signal pair output from the common mode driver during at least a portion of the low power state.

In another aspect of the invention, a device is provided. The device includes a common mode driver portion configured to drive an output signal at a common mode voltage during at least a portion of time when the device is in a low power state, and a data output driver portion configured to drive an output signal at a differential voltage level during at least a portion of time when the device is not in a low power state.

In yet another aspect of the invention, a computer readable storage device encoded with data that, when implemented in a manufacturing facility, adapts the manufacturing facility to create an apparatus is provided. The apparatus includes a common mode driver portion configured to drive an output signal at a common mode voltage during at least a portion of time when the device is in a low power state, and a data output driver portion configured to drive an output signal at a differential voltage level during at least a portion of time when the device is not in a low power state.

In yet another aspect of the invention, an apparatus is provided. The apparatus includes at least one data output driver portion configured to drive a data output signal from the at least one data output driver portion at a first and a second differential voltage and at least one common mode driver portion configured to drive a sleep/slumber output signal at a common mode voltage. The apparatus also includes a reference voltage circuit communicatively coupled to the at least one common mode driver portion, wherein the reference voltage circuit is configured to provide a reference voltage to the at least one common mode driver. The apparatus is configured to enter a low power state and drive the sleep/slumber output signal from the at least one common mode driver portion at the common mode voltage.

BRIEF DESCRIPTION OF THE DRAWINGS

The embodiments of the instant application may be understood by reference to the following description taken in conjunction with the accompanying drawings, in which the leftmost significant digit(s) in the reference numerals denote(s) the first figure in which the respective reference numerals appear, and in which:

FIG. 2 shows a simplified block diagram of an I/O interface, according to one exemplary embodiment;

FIG. 3A shows a simplified block diagram of an I/O interface on a silicon chip, according to one exemplary embodiment;

FIG. 3B illustrates an exemplary detailed representation of an I/O interface produced in a semiconductor fabrication facility, according to one exemplary embodiment;

Figure 1:
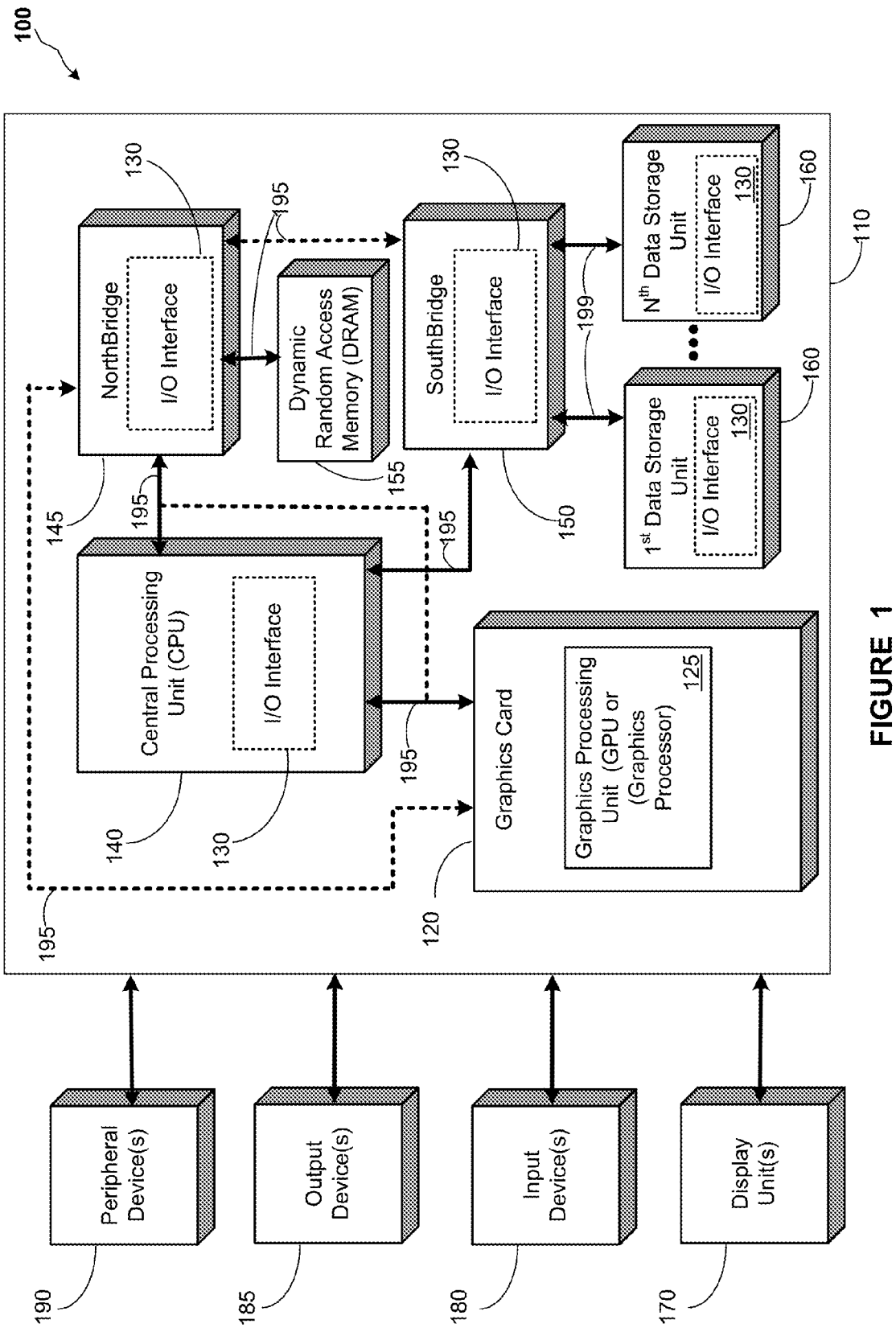
FIG. 1 schematically illustrates a simplified block diagram of a computer system including one or more input/output ("I/O") interfaces, according to one embodiment.

While the embodiments herein are susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the scope of the invention as defined by the appended claims.

DETAILED DESCRIPTION

Illustrative embodiments of the instant application are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present application will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present application. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the suffixes "_b" and "_n" (or "b" and "n") denote a signal that is active-low (i.e., the signal is activated or enabled when a logical '0' is applied to the signal). Signals not having these suffixes may be active-high (i.e., the signal is activated or enabled when a logical '1' is applied to the signal). While various embodiments and Figures herein are described in terms active-high and active-low signals, it is noted that such descriptions are for illustrative purposes of various embodiments and that alternate configurations are contemplated in other embodiments not explicitly described in this disclosure.

For discussion purposes, it is assumed that a digital signal 0 may approximately equal 0V (i.e., a ground node GND) and a digital signal 1 may approximately equal a power voltage node VDD. In alternate embodiments it is contemplated that values other than ground node and a power voltage node may be used for digital signals 0 and 1 respectively.

As used herein, the term "node" may mean a common connection, a common signal and/or a signal that corresponds to a value in a circuit or device described herein. For example, a circuit power signal having a given voltage potential may be described as VDD or a power node VDD, and a circuit ground may be described as GND or a ground node VDD. Similarly, a connection between circuit elements, such as the connectors of two resistors or the sources of a MOSFET, may be referred to as a node.

As used herein, the terms "substantially" and "approximately" may mean within 85%, 90%, 95%, 98% and/or 99%. In some cases, as would be understood by a person of ordinary skill in the art, the terms "substantially" and "approximately" may indicate that differences, while perceptible, may be negligent or be small enough to be ignored. Additionally, the term "approximately," when used in the context of one value being approximately equal to another, may mean that the values are "about" equal to each other. For example, when measured, the values may be close enough to be determined as equal by one of ordinary skill in the art.

As used herein, the term "data transmission device" may be a current-mode output driver, a voltage- or current-mode pre-driver, an I/O interface, a central processing unit ("CPU"), a southbridge, a northbridge, a graphics processor unit ("GPU"), some combination thereof and/or the like, as would be understood by a person of ordinary skill in the art having the benefit of this disclosure.

As shown in the Figures and as described below, the circuits described herein may comprise various circuit components such as, but not limited to, metal oxide semiconductor field effect transistors ("MOSFETs"), resistors, capacitors, power node(s) and ground node(s). The MOSFETs may be n-type (nFET) or p-type (pFET), as would be known to a person of ordinary skill in the art. Similarly, the power nodes may be of an implementation specific and/or variable voltage level, as would be known to a person of ordinary skill in the art. In one or more embodiments, the nFETs and/or pFETs described herein may operate as switches. For example, the nFETs and/or pFETs may operate to complete circuit paths to allow the flow of current, and/or to drive signals. It is also contemplated that other forms of switches may be used in the embodiments described herein without departing from the scope of such embodiments, as would be apparent to a person of ordinary skill in the art having the benefit of this disclosure.

Embodiments of the present application generally provide for a low-power wide-tuning range CML output drivers for serial interfaces. It is contemplated that various embodiments described herein are not mutually exclusive. That is, the various embodiments described herein may be implemented simultaneously with, or independently of, each other, as would be apparent to one of ordinary skill in the art having the benefit of this disclosure. Various embodiments herein may be described in terms of serial advanced technology attachment ("SATA") I/O interfaces. However, it should be noted that such descriptions are used in order to provide a basis for illustration and understanding of the embodiments presented herein. That is, the embodiments provided in this disclosure are not limited to SATA, but rather may be applied to other I/O interfaces as would be apparent to one of ordinary skill in the art having the benefit of this disclosure.

High speed I/O interfaces, such as SATA, require their associated interfaces to meet differential output signal parameters for different generations of the technologies (e.g., SATA Gen1, Gen2, Gen3, etc.). In SATA and other protocols, supply voltages may be as low as 1.0V, or lower. The generations of SATA must also meet strict differential peak-to-peak voltage parameters. For example, the differential peak-to-peak voltage may need to be as high as 1.0V. At submicron technologies requiring such parameters, variations (PVT corners) and/or the channel modulation effect can prevent operability and decrease yield. Therefore, it is difficult to tightly control currents and output voltages and simultaneously meet different parameter requirements, such as those in low power modes of operation.

High speed I/O and/or serial interfaces, such as SATA, require that an AC coupled transmitter shall hold its outputs at a zero differential voltage (i.e., the two single-ended output signals are at approximately the same voltage) with the same common-mode level (i.e., $V_{CM}$) for normal operation modes and for partial/low power modes. When operating in a sleep or slumber mode (e.g., a low power or partial power mode), the common mode voltage level of an AC-coupled I/O transmitter is allowed to float while maintaining a zero differential voltage (i.e., the two single-ended output signals are at approximately the same voltage). SATA, PCI Express, USB3, HyperTransport, and/or other protocols and interfaces each have similar requirements for their respective transmitters while in low-power/sleep/slumber modes and sleep modes. For an I/O transmitter with a CML output driver, the common mode voltage ($V_{CM}$) does not remain constant. The $V_{CM}$ may change when the differential output voltage and amplitude change. When the differential amplitude increases, the common-mode voltage may become lower. Because the differential peak-to-peak output voltage of a SATA transmitter that supports Gen3 data rate has to cover a wide range (e.g., from about 0.5V up to about 1.0V for SATA Gen1, Gen2 and Gen3 data rates), the common-mode voltage $V_{CM}$ in the active operating mode also varies over a wide range.

Furthermore, integrated circuit (IC) devices are non-ideal, and their characteristics vary greatly across PVT corners. For example, a power supply voltage VDD can vary up to ten percent (plus and/or minus) or more, temperature can vary from around 0° C. to about 125° C., and process varies in different skews. This means the common-mode voltage $V_{CM}$ in normal mode varies across PVT corners. Leakage currents may cause differential output signal voltages to drop when an output driver is turned off and put in a hi-impedance mode or state. As such, just turning off the output driver is not a solution to meet the aforementioned $V_{CM}$ requirement in a sleep/slumber mode.

Additional information on related I/O interfaces may be found in "Transmitter Equalization Method and Circuit Using Unit-Size and Fractional-Size Subdrivers in Output Driver for High-Speed Serial Interface," by Xin Liu, et al., filed concurrently as a separate application and incorporated herein by reference in its entirety, and "Method and Circuit for Precisely Controlling Amplitude of Current-Mode Logic Output Driver for High-Speed Serial Interface," by Xin Liu, et al., filed Sep. 6, 2001, as a separate application and incorporated herein by reference in its entirety.

Therefore, it is a challenging task to meet the aforementioned common-mode voltage $V_{CM}$ requirement and also keep the transmitter power dissipation low in SATA, and under other transmission schemes, for a partial/low power mode, when the different outputs vary across a wide range. The embodiments described herein show a novel design that efficiently solves this problem. The embodiments described herein may show a CML output driver circuit that uses a common mode driver circuit. The embodiments described herein may allow for precise output voltage control while simultaneously allowing for improved power efficiency and meeting strict voltage requirements such as those for outputs in low/sleep/slumber modes.

Turning now to FIG. 1, a block diagram of an exemplary computer system 100, in accordance with an embodiment of the present application, is illustrated. In various embodiments the computer system 100 may be a personal computer, a laptop computer, a handheld computer, a tablet computer, a mobile device, a telephone, a personal data assistant ("PDA"), a server, a mainframe, a work terminal, or the like. The computer system includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be a Radeon™ graphics card from Advanced Micro Devices ("AMD") or any other graphics card using memory, in alternate embodiments. The graphics card 120 may, in different embodiments, be connected on a Peripheral Component Interconnect "(PCI") Bus (not shown), PCI-Express Bus (not shown) an Accelerated Graphics Port ("AGP") Bus (also not shown), or any other connection known in the art. It should be noted that embodiments of the present application are not limited by the connectivity of the graphics card 120 to the main computer structure 110. In one embodiment, computer runs an operating system such as Linux, Unix, Windows, Mac OS, or the like.

In one embodiment, the graphics card 120 may contain a graphics processing unit (GPU) 125 used in processing graphics data. The GPU 125, in one embodiment, may include one or more embedded memories (not shown). In one embodiment, the embedded memory(ies) may be an embedded random access memory ("RAM"), an embedded static random access memory ("SRAM"), or an embedded dynamic random access memory ("DRAM"). In one or more embodiments, the embedded memory(ies) may be an embedded RAM (e.g., an SRAM). In alternate embodiments, the embedded memory(ies) may be embedded in the graphics card 120 in addition to, or instead of, being embedded in the GPU 125. In various embodiments the graphics card 120 may be referred to as a circuit board or a printed circuit board or a daughter card or the like.

In one embodiment, the computer system 100 includes a central processing unit ("CPU") 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, CPU 140, northbridge 145, GPU 125 may be included in a single package or as part of a single die or "chips" (not shown). Alternative embodiments which alter the arrangement of various components illustrated as forming part of main structure 110 are also contemplated. The CPU 140 and/or the northbridge 145, in certain embodiments, may each include one or more I/O interfaces 130. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present application. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In one embodiment, the southbridge 150 may have one or more I/O interfaces 130, in addition to any other I/O interfaces 130 elsewhere in the computer system 100. In various embodiments, the southbridge 150 may be connected to one or more data storage units 160 using a data connection or bus 199. The data storage units 160 may be hard drives, solid state drives, magnetic tape, or any other writable media used for storing data. In one embodiment, one or more of the data storage units may be SATA data storage units and the data connection 199 may be a SATA bus/connection. Additionally, the data storage units 160 may contain one or more I/O interfaces 130. In various embodiments, the central processing unit 140, northbridge 145, southbridge 150, graphics processing unit 125, DRAM 155 and/or embedded RAM may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present application. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to corresponding physical digital media, a universal serial buss ("USB") device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present application as would be understood by one of skill in the art.

In one embodiment, any number of computer systems 100 may be communicatively coupled and/or connected to each other through a network infrastructure. In various embodiments, such connections may be wired or wireless without limiting the scope of the embodiments described herein. The network may be a local area network (LAN), wide area network (WAN), personal network, company intranet or company network, the Internet, or the like. In one embodiment, the computer systems 100 connected to the network via the network infrastructure may be a personal computer, a laptop computer, a handheld computer, a tablet computer, a mobile device, a telephone, a personal data assistant (PDA), a server, a mainframe, a work terminal, any other computing device described herein, and/or the like. The number of computers connected to the network may vary; in practice any number of computer systems 100 may be coupled/connected using the network.

In one embodiment, computer systems 100 may include one or more graphics cards. The graphics cards 120 may contain a graphics processing unit (GPU) 125 used in processing graphics data. The GPU 125, in one embodiment, may include a memory structure 130. In one embodiment, the memory structure 130 may be an embedded static random access memory (SRAM). In one or more embodiments, the memory structure 130 may include embedded ECC logic. In alternate embodiments, the memory structure 130 may be embedded in the graphics card 120 in addition to, or instead of, being embedded in the GPU 125. In another embodiment, the graphics card 120 may include a non-embedded memory, for example a dynamic RAM (DRAM) in addition to any memory structures 130. The graphics card 120 may also include one or more display interfaces. To the extent certain exemplary aspects of the graphics card 120 are not described herein, such exemplary aspects may or may not be included in various embodiments without limiting the spirit and scope of the embodiments of the present application as would be understood by one of skill in the art. In one embodiment, the graphics processing unit 125 and memory structure 130 may reside on the same silicon chip as the CPU 140 and the northbridge 145. In one alternate embodiment, the graphics processing unit 125 and memory structure 130 may reside on the same silicon chip as the CPU 140. In such embodiments, the silicon chip(s) may be used in a computer system 100 in place of, or in addition to, the graphics card 120. The silicon chip(s) may be housed on the motherboard (not shown) or other structure of the computer system 100.

Turning now to FIG. 2, a simplified, exemplary representation of the I/O interface 130, and, according to one or more embodiments, a current-mode output driver 310, which may be used in silicon die/chips 340, as well as devices depicted in FIG. 1, according to various embodiments, is illustrated. However, those skilled in the art will appreciate that the I/O interface 130 may take on any of a variety of forms, including those previously described above, without departing from the scope of the embodiments of the instant application. The I/O interface 130 may be implemented as single elements (130) or in groups of logic (not shown).

Turning to FIG. 3A, the silicon die/chip 340 is illustrated as one or more the I/O interfaces 130, or any other configuration of the I/O interface as would be apparent to one of skill in the art having the benefit of this disclosure. As discussed above, various embodiments of the I/O interface 130 may be used in a wide variety of electronic devices, including, but not limited to, southbridge devices, central processing units, northbridge devices, motherboards, graphics cards, combinatorial logic implementations, stand-alone controllers, other integrated circuits (ICs), or the like.

Turning now to FIG. 3B, in accordance with one embodiment, and as described above, one or more of the I/O interfaces 130 may be included on the silicon die/chips 340 (or computer chip). The silicon die/chips 340 may contain one or more different configurations of the I/O interfaces 130 (e.g., I/O interfaces 130 configured to perform according to one or more connection standards, such as SATA). The silicon chips 340 may be produced on a silicon wafer 330 in a fabrication facility (or "fab") 390. That is, the silicon wafers 330 and the silicon die/chips 340 may be referred to as the output, or product of, the fab 390. The silicon die/chips 340 may be used in electronic devices, such as those described above in this disclosure.

Figure 4:
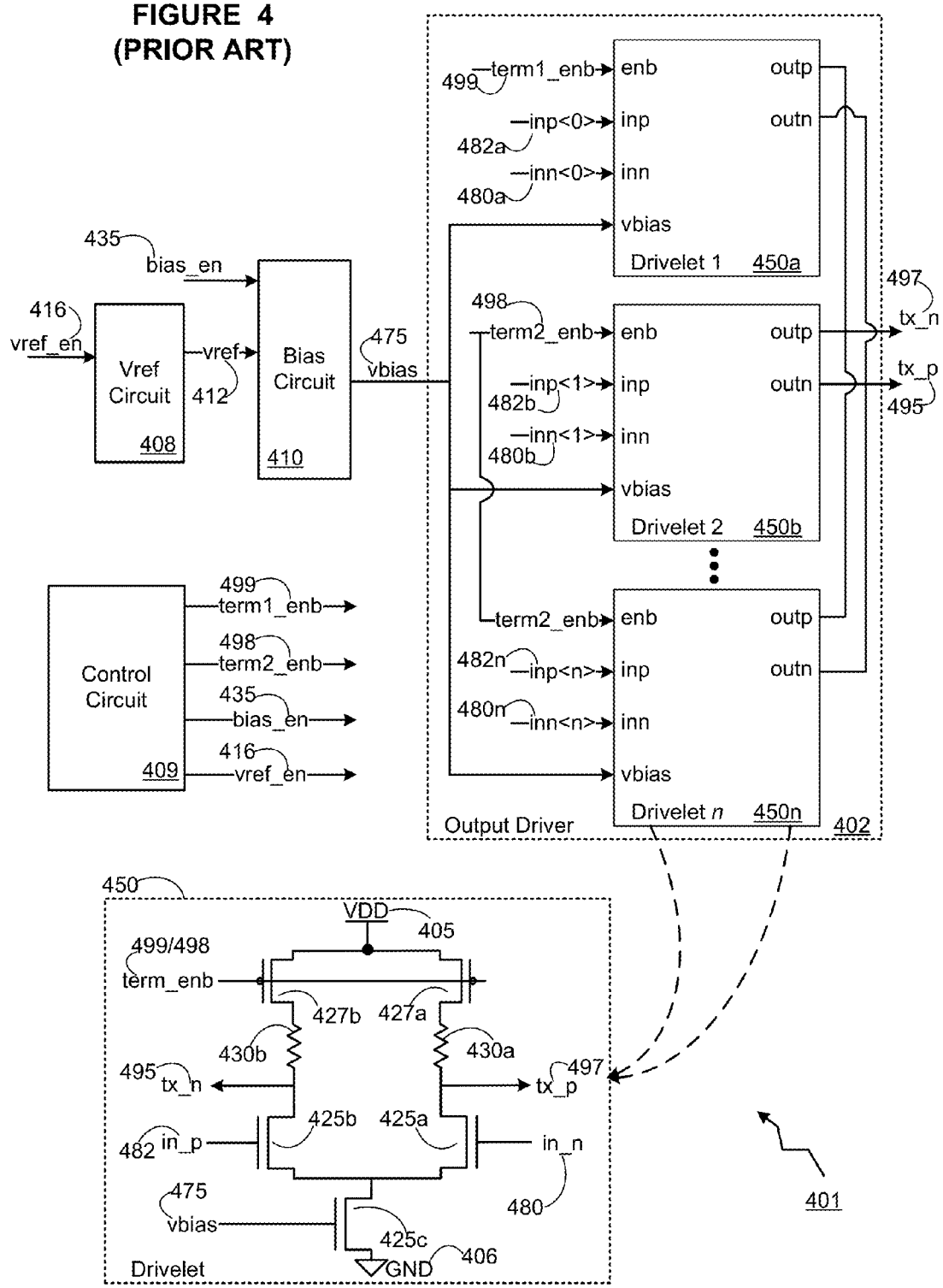
FIG. 4 illustrates a prior art schematic diagram of a CML output driver.

Turning now to FIG. 4, a block and schematic diagram of a prior art implementation of a CML output driver 401 is depicted. The prior art implementation uses an output driver 402, a vref circuit 408, a control circuit 409 and a bias circuit 410. The control circuit 409 may output enable signals term1_enb 499, term2_enb 498, bias_en 435 and vref_en 416. The vref circuit 408 may output a signal vref 412, and the bias circuit 410 may output a signal vbias 475. The output driver 402 may include one or more drivelet portions 450a-n, as would be known to one of ordinary skill in the art. The drivelets 450a-n may together provide for the total output drive current of the CML output driver 401. As illustrated by the generic drivelet 450, the drivelets 450a-n may comprise nFETs 425a-c, pFETs 427a-b and resistors 430a-b. The generic drivelet 450 may also include the following signals: an enable term_enb 499/498, a voltage bias vbias 475, inputs in_p 482 and in_n 480, outputs tx_p 497 and tx_n 495, and a power node VDD 405 and a ground node GND 406.

The prior art implementation shown in FIG. 4 uses the output driver 402 to maintain the same common-mode voltage in a sleep/slumber mode as during normal operation. As shown, the prior art implementation keeps a small part of the output driver 402 enabled (i.e., drivelet 450a), and at the same time pulls up both data inputs 480a and 482a of the output driver 402 to a power node VDD 405. Next, the remaining drivelets 450b-n may be turned off by putting them in a hi-impedance state. It should be noted that the bias circuit 410 needs to be kept on in this implementation. A problem of this solution is power dissipation. For an I/O transmitter that outputs a differential signal at 1.0V peak-to-peak, the CML output driver 401 part that remains on (e.g., the drivelet 450a and the bias circuit 410) usually consume at least 3 mA of current. This dissipates a large amount of power for a low power state and is wasteful. In a low or sleep/slumber mode, an enable signal term1_enb 499 is set to 0V and a term2_enb is set to the VDD 405. Thus the drivelet 450a is enabled and "on" while the remaining drivelets 450b-n are disabled and are "off". At the same time, the input signals inp<0> 482a and inn<0> 480a are pulled up to the VDD 405, and the inputs inp<1> 482b through inp<n> 482n as well as the inputs inn<1> 480b through inn<n> 480n are pulled down to 0V (e.g., pulled down to the GND 406). Therefore, the nFETs 425a-c and the pFETs 427a-b are turned on only in the drivelet 450a, and turned off in all other drivelets 450b-450n. This essentially enables only the drivelet 450a and disables all other drivelets 450b-450n. This configuration maintains the common-mode voltage in the sleep/slumber mode at the same level as in normal mode with less power dissipation than in normal mode; however, as previously mentioned, power dissipation remains problematic.

Figure 5:
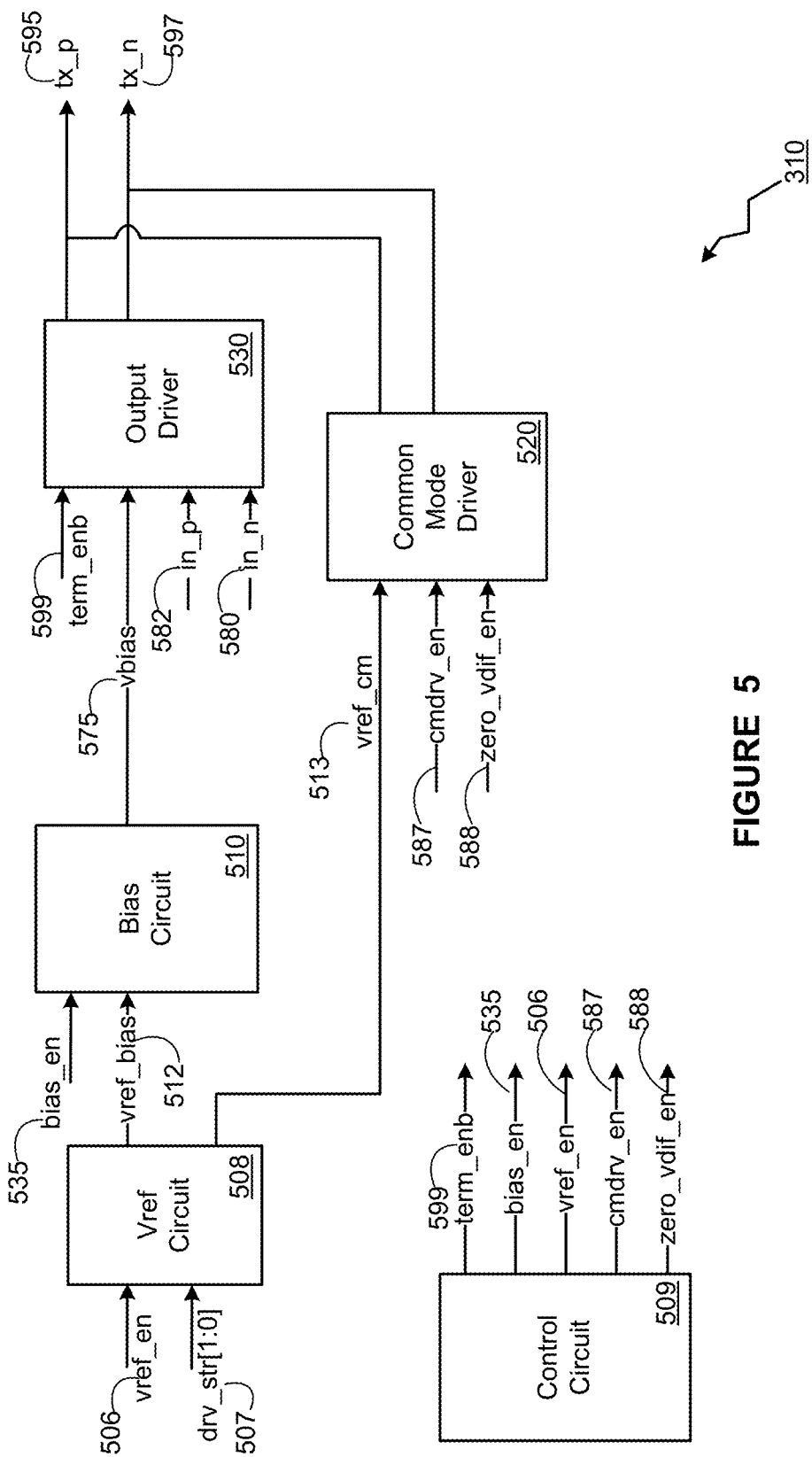
FIG. 5 illustrates a block diagram of a portion of an input/output ("I/O") interface, according to one exemplary embodiment.

Turning now to FIG. 5, a diagram of an exemplary block diagram implementation of a portion of the I/O interface 130 is illustrated, according to one embodiment. As previously described, in one or more embodiments, the I/O interface 130 may contain a current-mode output driver 310. As shown in FIG. 5, the current-mode output driver 310 may be implemented in one or more portions (e.g., a reference voltage (vref) circuit 508 portion, a bias circuit 510 portion, control circuit 509 portion, a common mode driver circuit 520 portion and/or an output driver circuit 530 portion), or may be implemented as one logical block. It should be noted that in various embodiments shown in the Figures and described herein, the current-mode output driver 310 may be implemented in a vref circuit 508 portion, a bias circuit 510 portion, control circuit 509 portion, a common mode driver circuit 520 portion and/or an output driver circuit 530 portion for purposes of illustration and conceptualization, however any configuration and/or partitioning of the current-mode output driver 310 may be used in accordance with the embodiments herein. In one embodiment, the vref circuit 508 may be included outside the current-mode output driver 310.

The bias circuit 510 and the control circuit 509 may act, in some embodiments, as, or as part of, an activation circuit. The activation circuit may include signals and/or hardware components to enable/disable various circuits and components of the current-mode output driver 310. The current-mode output driver 310 may receive a vref enable input signal vref_en 506 from the control circuit 509. The current-mode output driver 310 may receive a drive strength input signal drv_str[1:0] 507. The vref_en 506 and the drv_str[1:0] 507 signals may be input into the vref circuit 508. In various embodiments, the drv_str[1:0] 507 signal may be a 1-bit, 2-bit or 3-bit signal. In other embodiments, the drv_str[1:0] 507 signal may comprise a different number of bits. As shown in the exemplary, illustrated embodiment, the drv_str[1:0] 507 signal may comprise two bits ([1:0]) in order to provide four possible drive strength control settings, configurations and/or modes. In accordance with one embodiment, the vref circuit 508 may output an operating mode vref bias signal vref_bias 512 to the bias circuit 510 and may output a common mode vref signal 513 to the common mode driver circuit 520. The bias circuit 510 may also receive as an input a bias enable signal bias_en 535 from the control circuit 509. The bias circuit 510 may output a voltage bias signal vbias 575 to the output driver circuit 530.

The control circuit 509 may also output, an enable signal term_enb 599, a common mode drive enable signal cmdrv_en 587 and a zero voltage differential enable zero_vdif_en 588. The cmdrv_en 587 and the zero_vdif_en 588 may be output to the common mode driver 520. The term_enb 599 may be output to the output driver 530. The output driver 530 may also receive as inputs a differential signal pair in_p 582 and in_n 580. In one embodiment, the differential signal pair in_p 582 and in_n 580 may provide a differential data signal input to the output driver 530 to be driven out as the outputs tx_p 595 and tx_n 597 respectively. In accordance with one embodiment, the tx_p 595 and the tx_n 597 may be driven out by the common mode driver 520 instead of, or in addition to, the output driver 530.

TABLE 1

Control Circuit Output Settings

| Output | Normal Mode | Partial Power Mode | Sleep Power Mode |
|---|---|---|---|
| term_enb | 0 | 1 | 1 |
| bias_en | 1 | 0 | 0 |
| vref_en | 1 | 1 | 0 |
| cmdrv_en | 0 | 1 | 0 |
| zero_vdif_en | 0 | 1 | 1 |

Turning now to Table 1, configurations and/or settings for the control circuit 509 outputs are shown, in accordance with one embodiment. In one embodiment, the current mode output driver 310 may operate in many different modes, and as shown in Table 1, these modes may include: a normal mode, a sleep/slumber mode, and a sleep/slumber power mode. In the normal mode, the current mode output driver 310 operates at full power in a standard mode of operation. In the normal mode, the term_enb 599 may be set to 0 (i.e., enabled), the bias_en 535 may be set to 1 (i.e., enabled), the vref_en 506 may be set to 1 (i.e., enabled), the cmdrv_en 587 may be set to 0 (i.e., disabled), and the zero_vdif_en may be set to 0 (i.e., disabled). In the sleep/slumber mode, the current mode output driver 310 operates in a reduced power mode of operation while maintaining and/or driving signals at its outputs tx_p 595 and tx_n 597. In the sleep/slumber mode, the term_enb 599 may be set to 1 (i.e., disabled), the bias_en 535 may be set to 0 (i.e., disabled), the vref_en 506 may be set to 1 (i.e., enabled), the cmdrv_en 587 may be set to 1 (i.e., enabled), and the zero_vdif_en may be set to 1 (i.e., enabled). In the sleep/slumber power mode, the current mode output driver 310 may be off and may not drive signals at its outputs tx_p 595 and tx_n 597. In the sleep/slumber mode, the term_enb 599 may be set to 1 (i.e., disabled), the bias_en 535 may be set to 0 (i.e., disabled), the vref_en 506 may be set to 0 (i.e., disabled), the cmdrv_en 587 may be set to 0 (i.e., disabled), and the zero_vdif_en may be set to 1 (i.e., enabled). The configurations and/or settings for the control circuit 509 outputs will be discussed in further detail below with respect to the remaining Figures.

Figure 6A:
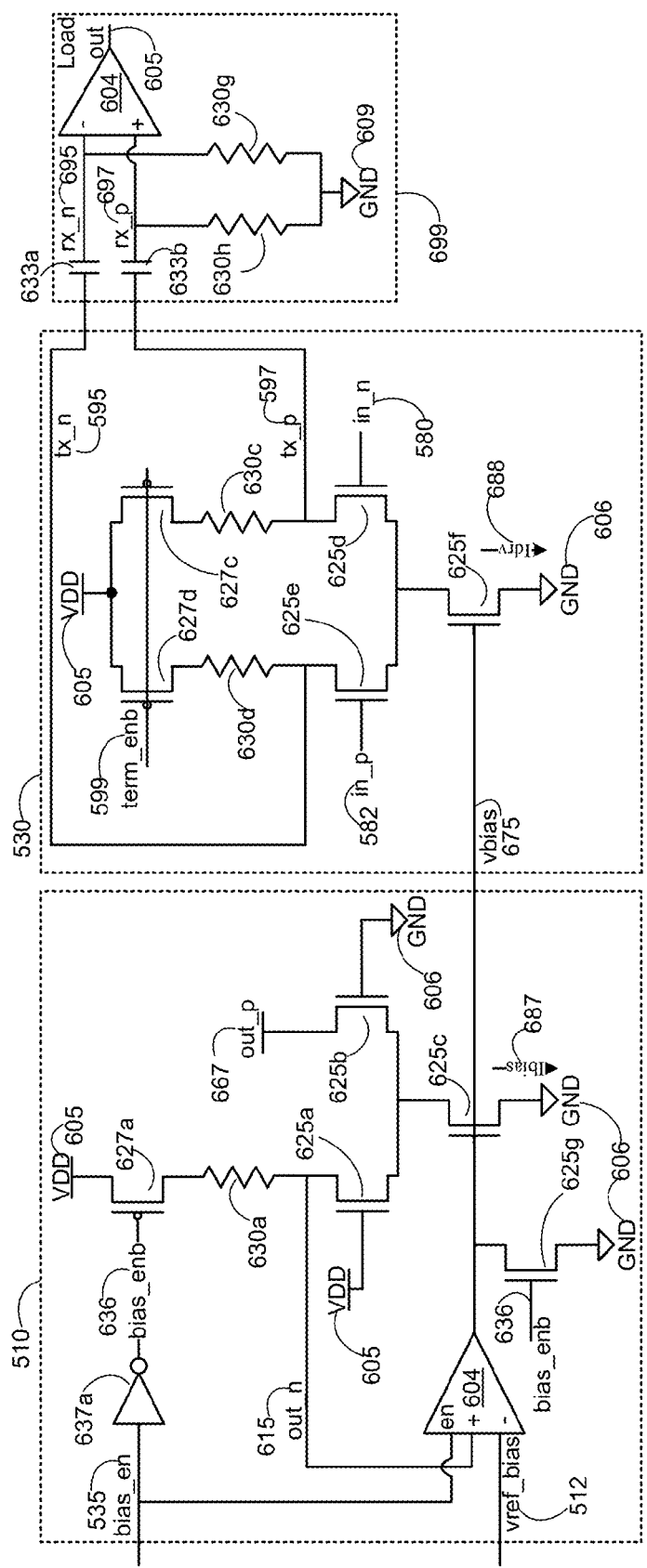
FIG. 6A illustrates a schematic diagram of a portion of an input/output ("I/O") interface, according to one exemplary embodiment.

Turning now to FIG. 6A, a diagram of an exemplary implementation of a portion of the I/O interface 130 is illustrated, according to one embodiment. As previously described, in one or more embodiments, the I/O interface 130 may contain a current-mode output driver 310. FIG. 6A shows a more detailed illustration of the current-mode output driver 310. In one embodiment, the current-mode output driver 310 may be implemented in one or more portions (e.g., a bias circuit 510 portion and an output driver circuit 530 portion), or may be implemented as one logical block. The current-mode output driver 310 may also include a power voltage node VDD 605 (i.e., a supply voltage for supplying operating voltage to one or more circuits) and a ground voltage node GND 606.

In one or more embodiments, as described above, the bias circuit 510 may receive the vref_bias 512 and the bias_en 535 as inputs. The vref_bias 512 may be transmitted to the negative input of a differential amplifier 604 in the bias circuit 510, The bias_en 535 may be transmitted to the enable input of the differential amplifier 604 in the bias circuit 510 may act as an enable signal. The differential amplifier 604 may have its positive input connected to a signal out_n 615 described below. In one embodiment, the differential amplifier 604 may be a high gain differential amplifier. The differential amplifier 604 may have its output connected to the gate of an nFET 625c in the bias circuit 510 and to the gate of an nFET 625f in the output driver circuit 530. The output of the differential amplifier 604 may be referred to as a voltage bias (vbias) 575. In one embodiment, the bias circuit 510 may also include an nFET 625a and an nFET 625b. The nFET 625a may have its gate connected to the VDD 605, and the nFET 625b may have its gate connected to the GND 606. The nFETs 625a-b may have their sources connected together and connected to the drain of the nFET 625c. The nFET 625c may have its source connected to the GND 606. The nFET 625a may have its source connected to a first connection of a resistor 630a. In one embodiment, the resistor 630a may be a terminal resistor. The node connection of the source of nFET 625a and the first connection of the resistor 630a may be the out_n 615. As described above, the out_n 615 may be connected to the positive input of the operational amplifier 604. Such a connection (along with the negative input of the differential amplifier 604 being connected to vref_bias 512) may provide a feedback loop such that the voltage of node out_n 615 is equal to the voltage vref_bias 512 (i.e., Vout_n=vref_bias 612). The second connection of the resistor 630a may be connected to the drain of a pFET 627a. The pFET 627a may have its source connected to the VDD 605 and its gate connected to the output of an inverter 637, i.e., bias_enb 636. The input of the inverter 637 may be connected to the bias_en 535.

The signal vbias 575 may be connected to the drain of an nFET 625g. The nFET 625g may have its source connected to the GND 606 and its gate connected to the bias_enb 636. In one embodiment, applying a positive voltage via the vbias 575 at the gate of nFET 625c may cause a bias current Ibias 687 to flow from the VDD 605 through the resistor 630a and the nFET 625a to the GND 606.

Because the gate of nFET 625b is connected to the GND 606, the nFET 625b will remain "off" and will not allow any current to flow through the nFET 625b. As such, the drain of the nFET 625b (i.e., node out_p 667) may be connected to the VDD 605, the GND 606, or any other constant voltage in the system between the VDD 605 and the GND 606, or may be left floating. It should be noted that in alternate bias circuit implementations (not shown), the nFET 625b may be connected to a resistor (not shown) in a similar fashion as the nFET 625a is connected to the resistor 630a. In such an alternate implementation, the resistor connected to the nFET 625b may be connected to the VDD 605 directly or via a pFET (not shown) in a similar fashion as the nFET 625a is connected to the VDD 605 via the resistor 630a and the pFET 627a.

The nFET 625f of output driver circuit 530 may have its gate connected to the vbias 575 and the drain of the nFET 625g, in one embodiment. The nFET 625f may have its source connected to the GND 606. In one or more embodiments, the output driver circuit 530 may also include an nFET 625d and an nFET 625e. The nFETs 625d-e may have their sources connected together and connected to the drain of nFET 625f. The gate of the nFET 625d may be connected to a differential input signal in_n 580, and the gate of the nFET 625e may be connected to a differential input signal in_p 582. In one embodiment, the differential input signals in_n 580 and in_p 582 form a differential signal pair. The drain of the nFET 625d may be connected to a first connection of a resistor 630c, and the drain of the nFET 625e may be connected to a first connection of a resistor 630d. In one embodiment, the resistors 630c-d may be terminal resistors. The node connection of the drain of the nFET 625d and the first connection of the resistor 630c may be output as a differential signal tx_p 597, and the node connection of the drain of the nFET 625e and the first connection of the resistor 630d may be output as a differential signal tx_n 595. In one embodiment, the differential output signals tx_p 597 and tx_n 595 form a differential signal pair.

The second connections of the resistors 630c-d may be connected to the drains of pFETs 627c and 627d respectively. The pFETs 627c-d may have their sources connected to the VDD 605 and their gates connected to the term_enb 599. In one embodiment, applying a positive voltage via the vbias 575 at the gate of nFET 625f may cause a drive current Idrv 688 to flow from the VDD 605 through the pFET 627c, the resistor 630c and the nFETs 625d,f to the GND 606 when the signal in_n 580 is a positive voltage. When the signal in_p 582 is a positive voltage, applying a positive voltage via the vbias 575 at the gate of nFET 625f may cause the drive current Idrv 688 to flow from the VDD 605 through the pFET 627d, the resistor 630d and the nFETs 625e,f to the GND 606.

In one embodiment, the resistors 630c-d may have the same resistance value. The ratio of the resistance values of the resistor 630a to the resistance values of the resistors 630c-d may be described as a value "m". That is, the resistance values of resistors 630c and 630d may be described as "Rtx" while the resistance values of resistor 630a ("Rbias") may be described as "Rbias=m·Rtx" (i.e., "Rtx" multiplied by "m") or "Rbias/Rtx=m". Thus, the values of the resistor 630a may be an integer multiple (or a non-integer multiple) of resistance values of resistors 630c and/or 630d. For example, if Rtx is 50Ω (i.e., the resistance values of resistors 630c and/or 630d are 50Ω) and "m" is 3, the values of the resistor 630a may be 150Ω (that is, m·Rtx=3·50Ω=150Ω). The ratio of the current amplitude values of the currents Ibias 687 and Idrv 688 may be described as a value "n". In one embodiment, the current Ibias 687 may be equal to the current Idrv 688 divided by "n" (i.e., "Ibias=Idrv/n" or "Idrv/Ibias=n"). That is, the amplitude value of the current Idrv 688 may be an integer multiple (or non-integer multiple) of the amplitude value of the current Ibias 687. For example, if the current Idrv 688 is 80 mA, and "n" is 4, that value of the amplitude of the current Ibias 687 may be 20 mA (that is, Idrv/n=80 mA/4=20 mA). In one embodiment, the relationship between the ratio value "m" and "n" can be described as:

$m = ¾·n$ (i.e., "m"=three fourths of "n"), or $m/n = ¾$.

In one embodiment, the size of the nFETs 625d-e in the output driver circuit 630 is "n" times the size of the nFETs 625a-b in the bias circuit 510. In other words, for example, the size of the nFETs 625a-b may be described as nFET $625d_{SIZE}$=n·nFET $625a_{SIZE}$. That is, the size of the nFETs 625d-e may be an integer multiple (or non-integer multiple) of the size of the nFETs 625a-b. Similarly, in one embodiment, the size of the nFET 625f in the output driver circuit 630 is "n" times the size of the nFET 625c in the bias circuit 510. In other words, for example, nFET $625f_{SIZE}$=n·nFET $625c_{SIZE}$. That is, the size of the nFET 625f may be an integer multiple (or non-integer multiple) of the size of the nFET 625c. The ratio of the sizes of the pFETs 627c,d to the pFET 627a may be similarly proportioned using the ratio value "n".

The configurations generally described above with respect to FIG. 6A, may allow for the following relationships and equations. The voltage at the out_n 615 may be described as:

$V_{out\_n}$=vref_bias 512.

According to Ohm's Law, Vout_n is equal to VDD 605 minus the resistance value of resistor 630a multiplied by the current Ibias 687, and therefore, Vout_n is equal to VDD 605 minus the product of "m" multiplied by the resistance of resistor 630c (630d) multiplied by the current Ibias 687, thus Vout_n is equal to the VDD 605 minus three fourths multiplied by "n" multiplied by the resistance of resistor 630c (630d) multiplied by the current Ibias 687, or:

$$V_{out\_n} = VDD - Ibias \cdot R_{630a} \quad (2)$$
$$= VDD - Ibias \cdot m \cdot R_{630c}$$
$$= VDD - \frac{3}{4} \cdot n \cdot Ibias \cdot R_{630c}.$$

It is noted that mismatches between the voltages at the sources of the nFETs 625a-b and the sources of the nFETs 625d-e may cause the current Idrv 688 to be greater than or less than "n·Ibias" ("n" multiplied by Ibias 687). This may present a current discrepancy that may manifest itself as an inability to finely tune and/or control the output voltage of a serial communication interface, including output voltages at low power. The channel modulation effect may compound this discrepancy between the currents as semiconductor technologies become smaller and smaller. It is noted that providing the ability to finely tune and/or control the output voltages for serial communication interfaces, including low power output voltages, PVT corners may have less impact on circuit/ product performance and/or yield.

Figure 6B:
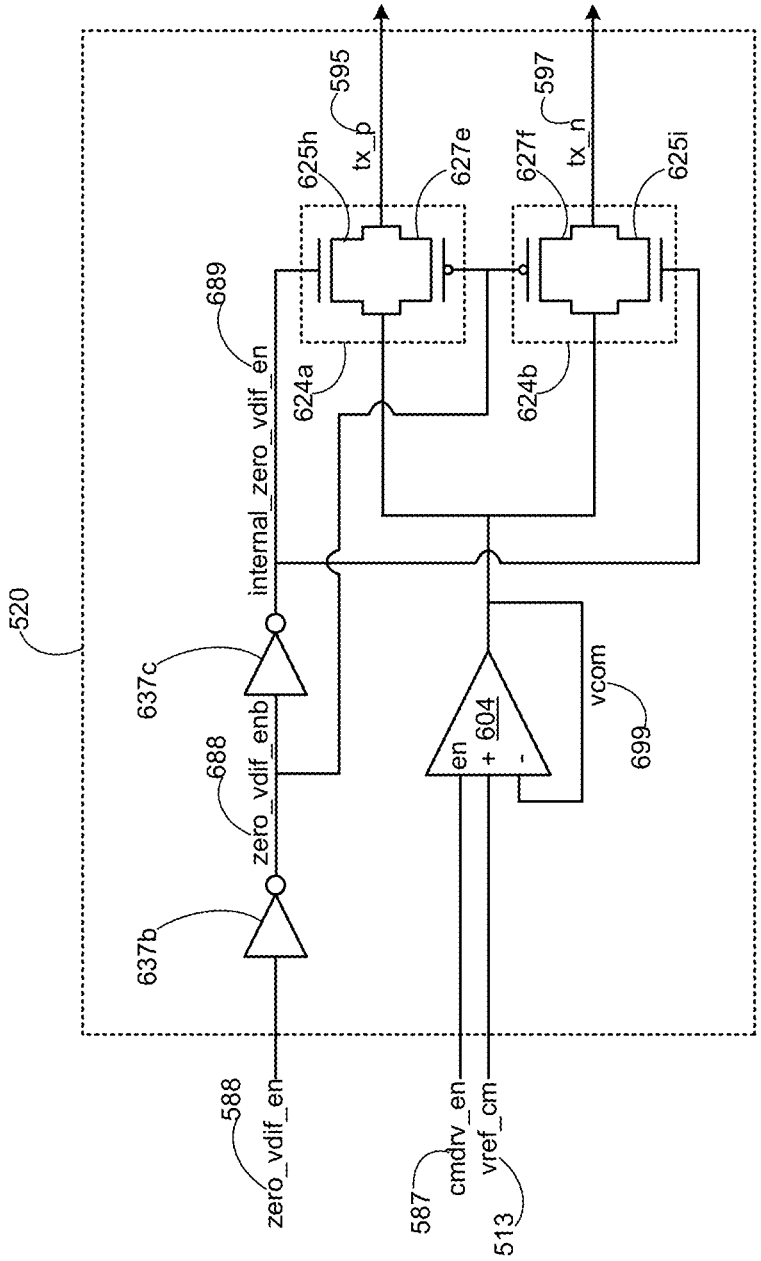
FIG. 6B illustrates a schematic diagram of a portion of an input/output ("I/O") interface, according to one exemplary embodiment.

Turning now to FIG. 6B, a more detailed schematic diagram of the common mode driver 520 is illustrated, in accordance with one embodiment. As described above, the common mode driver 520 may receive as inputs the signals vref_cm 513, cmdrv_en 587 and zero_vdif_en 588. The zero_vdif_en 588 may be connected to the input of an inverter 637b. The inverter 637b may have its output connected to the input of an inverter 637c. The output of the inverter 637c may be a node internal_zero_vdif_enb 689. The output of the inverter 637c may be a node of the signal internal_zero_vdif_en 689, which may be a double inversion of the input signal zero_vdif_en 588. The vref_cm 513 and the cmdrv_en 587 may be connected to the positive input and the enable input (respectively) of a differential amplifier 604. The differential amplifier 604 may have its negative input and its output connected to a node vcom 699. The common mode driver 520 may also include one or more pass-gates 624a-b, nFETs 625h-i and pFETs 627e-f. The pass-gate 624a may include the nFET 625h and the pFET 627e. The pass-gate 624b may include the nFET 625i and the pFET 627f. The gates of the nFETs 625h-i may be connected to the internal_zero_vdif_en 689, and the gates of the pFETs 627e-f may be connected to the node zero_vdif_enb 688. The nFET 625h may have its drain connected to the source of the pFET 627e and may have its source connected to the drain of the pFET 627e. The nFET 625i may have its drain connected to the source of the pFET 627f and may have its source connected to the drain of the pFET 627f. The drain of the nFET 625h and the source of the pFET 627e may be connected to the node vcom 699, and the source of the nFET 625h and the drain of the pFET 627e may be output as the tx_p 595. The drain of the nFET 625i and the source of the pFET 627f may be connected to the node vcom 699, and the source of the nFET 625e and the drain of the pFET 627f may be output as the tx_n 597. It should be noted that other configurations of pass-gates (not shown) may be used, as would be known by a person of ordinary skill in the art having the benefit of this disclosure.

The exemplary implementation described with respect to FIG. 6B above may allow for the node vcom 699 to be approximately equal to the voltage of the signal vref_cm 513. This may allow for the voltage vcom 699 to be output on the tx_p 595 and the tx_n 597 when the internal_zero_vdif_en 689 is "1" and the zero_vdif_enb is "0". That is, when the internal_zero_vdif_en 689 is "1", the nFETs 625h-i will be turned "on", and when the zero_vdif_enb is "0", the pFETs 627e-f will be turned on. Because the voltage at the vcom 699 is approximately equal to the voltage of the vref_cm 513, it may be possible to drive the tx_p 595 and the tx_n 597 to the same voltage as the vref_cm 513. Thus, in a sleep/slumber mode, differential outputs (e.g., the tx_p 595 and the tx_n 597) may be driven to a common mode voltage ($V_{CM}$ as described below with respect to FIG. 10) corresponding to the differential output signals. The common mode voltage may be set to a desired value by setting the vref_cm. As such, the common mode voltage may also be precisely controlled and easily adjusted/tuned.

TABLE 2

| | | | Switch Control Settings | | | | | |
|---|---|---|---|---|---|---|---|---|
| drv_str[1:0] | S3_en | S2_en | S1_en | S0_en | S3 | S2 | S1 | S0 |
| 0 0 | 0 | 0 | 0 | 1 | 0 | 0 | 0 | 1 |
| 0 1 | 0 | 0 | 1 | 0 | 0 | 0 | 1 | 0 |

TABLE 2-continued

Switch Control Settings

| drv_str[1:0] | S3_en | S2_en | S1_en | S0_en | S3 | S2 | S1 | S0 |
|---|---|---|---|---|---|---|---|---|
| 1 0 | 0 | 1 | 0 | 0 | 0 | 1 | 0 | 0 |
| 1 1 | 1 | 0 | 0 | 0 | 1 | 0 | 0 | 0 |

Figure 7:
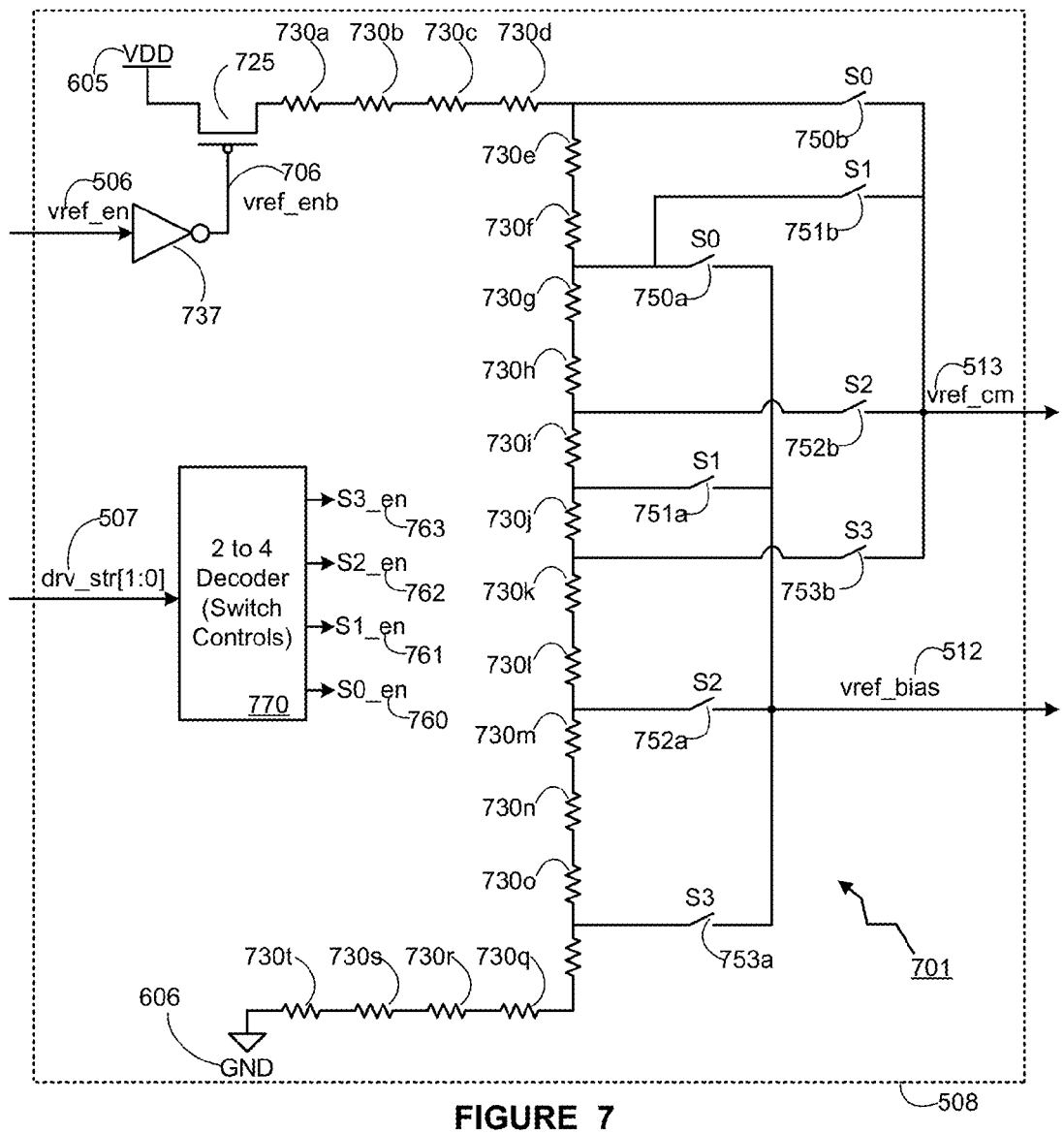
FIG. 7 illustrates a schematic diagram of a portion of an input/output ("I/O") interface, according to one exemplary embodiment.

S3-S0 Legend: "1"—Switch on; "0"—Switch off
S3_en-S0_en Legend: "1"—enabled; "0"—not enabled Turning now to FIG. 7 and corresponding Table 2, an exemplary drive strength control circuit and control settings table are illustrated, in accordance with one embodiment. The I/O interface 130 and/or the current-mode output driver 310 may include a drive strength control circuit 701. In one embodiment, the drive strength control circuit 701 may be included in the vref circuit 508. In one or more embodiments, the drive strength control circuit 701 may include a configuration of resistors, inverters and/or buffers, decoders, signal lines, MOSFETs and/or switches adapted to control the voltages of the signals vref_bias 512 and/or vref_cm 513.

The drive strength control circuit 701 may include an inverter 737 that receives the vref_en 506 as an input and outputs an inverted signal vref_enb 706. The vref_enb 706 may be connected to the gate of a pFET 725. The pFET 725 may have its source connected to the VDD 605 and its drain connected to a resistor 730a. The drive strength control circuit 701 may include a plurality of resistors 730a-t. In one embodiment, the resistors 730a-t may each have approximately the same resistance value. In various embodiments, the resistors 730a-t may be calibrated to any resistance value given that the resistors 730a-t each have approximately the same resistance value. Alternately, the resistors 730a-d and the resistors 730q-t may be equivalently configured (e.g., in different numbers of resistors and/or different resistance values) such that the effective resistance of the resistors 730a-d and the resistors 730q-t remains approximately the same. In one embodiment the resistors 730a-t may be connected in series between the pFET 725 and the GND 606, as exemplarily depicted in FIG. 7.

The drive strength control circuit 701 may also include one or more switches S0 750a-b, S1 751a-b, S2 752a-b and/or S3 753a-b. The switch 750a may have its input connected to the node between the resistors 730f and 730g. The switch 751a may have its input connected to the node between the resistors 730i and 730j. The switch 752a may have its input connected to the node between the resistors 730l and 730m. The switch 753a may have its input connected to the node between the resistors 730o and 730a. The outputs of the switches 750a, 751a, 752a and 753a may be connected to the vref_bias 512. That is, when any of the switches 750a, 751a, 752a and/or 753a are on/closed/active, the inputs of the respective switches will be connected to the vref_bias 512. The switch 750b may have its input connected to the node between the resistors 730d and 730e. The switch 751b may have its input connected to the node between the resistors 730f and 730g. The switch 752b may have its input connected to the node between the resistors 730h and 730i. The switch 753b may have its input connected to the node between the resistors 730j and 730k. The outputs of the switches 750b, 751b, 752b and 753b may be connected to the vref_cm 513. That is, when any of the switches 750b, 751b, 752b and/or 753b are on/closed/active, the inputs of the respective switches will be connected to the vref_cm 513.

The switches S0 750a-b, S1 751a-b, S2 752a-b and/or S3 753a-b may be controlled by corresponding switch enable signals. The switch enable signals S0_en 760, S1_en 761, S3_en 762, and/or S3_en 763 may be output by a switch control decoder 770. The switch control decoder 770 may receive the drv_str[1:0] 507 as an input. The switch control decoder 770 may decode the switch enables signals S0_en 760, S1_en 761, S3_en 762, and/or S3_en 763 based on the input drv_str[1:0] 507 according to the values shown in Table 2 below. In one embodiment, the S0_en 760, S1_en 761, S3_en 762, S3_en 763 may be output in a one-hot format by the switch control decoder 770. The switch enable signals S0_en 760, S1_en 761, S3_en 762 and S3_en 763 may correspond respectively to the switches S0 750a-b, S1 751a-b, S2 752a-b and S3 753a-b. That is, the S0_en 760 may correspond to, and activate/deactivate, the switches S0 750a-b, the S1_en 761 may correspond to, and activate/deactivate, the switches S1 751a-b, the S3_en 762 may correspond to, and activate/deactivate, the switches S2 752a-b, and the S3_en 763 may correspond to, and activate/deactivate, the switches S3 753a-b.

As is shown in Table 2, the drive strength signal drv_str[1:0] 507 may allow for up to four drive strength configurations. That is, the two-bit drv_str[1:0] 507 may have a value of 00, 01, 10 or 11. For a drv_str[1:0] 507 value of 00, the switches S0 750a-b may be closed (i.e., activated so that the switch will conduct current and pass a voltage from the input to the output of the switch), while the switches S1 751a-b, S2 752a-b and S3 753a-b may remain open (i.e., activated so that the switches will not conduct current or pass a voltage from the input to the output of the switch). For a drv_str[1:0] 507 value of 01, the switch S1 751a-b may be closed (i.e., activated so that the switch will conduct current and pass a voltage from the input to the output of the switch), while the switches S0 750a-b, S2 752a-b and S3 753a-b may remain open (i.e., activated so that the switches will not conduct current or pass a voltage from the input to the output of the switch). For a drv_str[1:0] 507 value of 10, the switch S2 752a-b may be closed (i.e., activated so that the switch will conduct current and pass a voltage from the input to the output of the switch), while the switches S0 750a-b, S1 751a-b and S3 753a-b may remain open (i.e., activated so that the switches will not conduct current or pass a voltage from the input to the output of the switch). For a drv_str[1:0] 507 value of 11, the switch S3 753a-b may be closed (i.e., activated so that the switch will conduct current and pass a voltage from the input to the output of the switch), while the switches S0 750a-b, S1 751a-b and S2 752a-b may remain open (i.e., activated so that the switches will not conduct current or pass a voltage from the input to the output of the switch).

Referring back to FIG. 7 and still in reference to Table 2, as an exemplary implementation illustration, the drive strength control circuit 701 may receive a signal via the vref_en 506 (e.g., vref_en 506 is "1") that will in turn cause the vref_enb 706, by virtue of the inverter 737, to become "0". This may activate the pFET 725 and cause a current to flow from the VDD 605, through the resistors 730a-t, to the GND 606. Based on Ohm's Law, the nodes between the serially connected resistors may acquire certain voltage values. This may allow for the inputs of the switches S0 750a-b, S1 751a-b, S2 752a-b and/or S3 753a-b to be at various voltage potentials as determined by the configuration of the resistors 730a-t. As such, when a given switch (e.g., S0 750a-b, S1 751a-b, S2 752a-b and/or S3 753a-b) is activated/closed/on, the voltage at the input of the given switch may be present at the given switch's output, and a current (also determined by Ohm's Law) may flow to the given switch's output from the VDD 605 and through any intervening resistors (e.g., any of the resistors 730a-t between the given switch and the VDD 605). In one embodiment, the voltage values of the vref_bias 512 and/or the vref_cm 513 may approximately correspond the values as shown below in Table 3.

TABLE 3

Signal Voltage Based on Drive Strength Signal

| drv_str[1:0] | vref_bias (V) | vref_cm (V) | VTX_DIFF_PP (V) | Normal Mode - VCM (V) |
|---|---|---|---|---|
| 0 0 | 0.70 | 0.80 | 0.40 | 0.80 |
| 0 1 | 0.55 | 0.70 | 0.60 | 0.70 |
| 1 0 | 0.40 | 0.60 | 0.80 | 0.60 |
| 1 1 | 0.25 | 0.50 | 1.00 | 0.50 |

Turning now to Table 3, voltages of the vref_bias 512, the vref_cm 513, the peak-to-peak differential output voltage $V_{TX\_DIFF\_PP}$ and the normal operating mode common mode voltage $V_{CM}$ are shown with respect to different values of the drv_str[1:0] 507 as described above with respect to FIG. 7 and Table 2. For ease of illustration, the Table 3 values correspond to a 1.0V VDD 605. As shown in Table 3, for a drv_str[1:0] value of 00, the voltage of the vref_bias 512 may be approximately 0.70V, the value of the vref_cm 513 may be approximately 0.80V, the value of the $V_{TX\_DIFF\_PP}$ may be 0.40V and the normal mode $V_{CM}$ may be 0.80V. For a drv_str[1:0] value of 01, the voltage of the vref_bias 512 may be approximately 0.55V, the value of the vref_cm 513 may be approximately 0.70V, the value of the $V_{TX\_DIFF\_PP}$ may be 0.60V and the normal mode $V_{CM}$ may be 0.70V. For a drv_str[1:0] value of 10, the voltage of the vref_bias 512 may be approximately 0.40V, the value of the vref_cm 513 may be approximately 0.60V, the value of the $V_{TX\_DIFF\_PP}$ may be 0.80V and the normal mode $V_{CM}$ may be 0.60V. For a drv_str[1:0] value of 11, the voltage of the vref_bias 512 may be approximately 0.25V, the value of the vref_cm 513 may be approximately 0.50V, the value of the $V_{TX\_DIFF\_PP}$ may be 1.00V and the normal mode $V_{CM}$ may be 0.50V. It is noted that under alternate configurations of the embodiments described herein, different voltage values for the signals shown in Table 3 may be achieved for the values of the drv_str[1:0] described.

Figure 8:
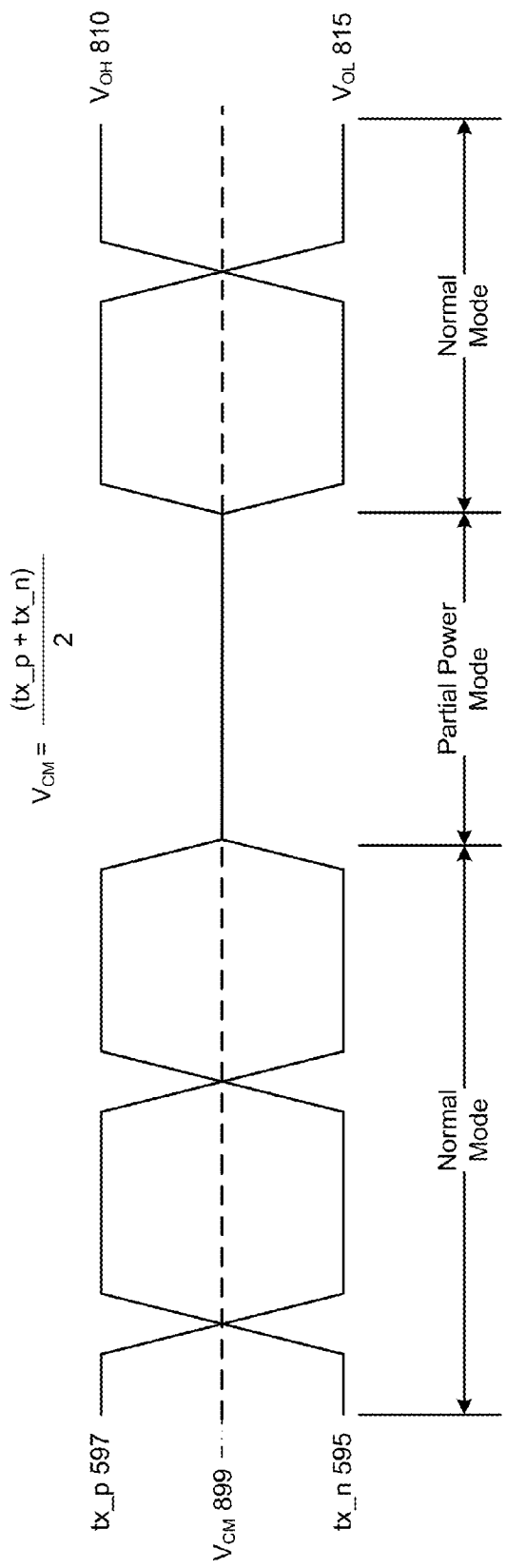
FIG. 8 illustrates a diagram of a differential signal, according to one exemplary embodiment.

Turning now to FIG. 8, a schematic waveform diagram of a switching differential signal pair is depicted, in accordance with one embodiment. FIG. 8 shows two differential signals tx_p 597 and tx_n 595; the tx_p 597 and the tx_n 595 may be referred to as single-ended output signals, in one or more embodiments. In one embodiment, during the normal operating mode, the values of the differential signals tx_p 597 and tx_n 595 may swing between a peak high single-ended output voltage $V_{OH}$ 810 and a peak low single-ended output voltage $V_{OL}$ 815. That is, tx_p 597 may have a high value of the $V_{OH}$ 810 and a low value of $V_{OL}$ 815. Similarly, tx_n 595 may have a high value of the $V_{OH}$ 810 and a low value of the $V_{OL}$ 815. The values of the differential signals tx_p 597 and tx_n 595 are equal to each other midway through the voltage swing at a common-mode voltage $V_{CM}$ 899. The value of $V_{CM}$ 899 may be described as $V_{CM}$ 899=(tx_p 597+tx_n 595)/2, (i.e., the sum of the voltages of the tx_p 597 and the tx_n 595 divided by 2) or as $V_{CM}$ 899=($V_{OH}$ 810+$V_{OL}$ 815)/2, (i.e., the sum of the $V_{OH}$ 810 and the $V_{OL}$ 815, with the sum divided by 2). In one embodiment, the $V_{CM}$ 899 may be determined as $V_{CM}$=VDD−⅔·(VDD−vref), where VDD is the VDD 605 and vref is the vref_bias 512. Therefore the vref_cm 513 may be determined as vref_cm=VDD−⅔·(VDD−vref_bias).

In one embodiment, the I/O interface 130 and/or current-mode output driver 310 may operate in a sleep/slumber mode during which the I/O interface 130 and/or current-mode output driver 310 may maintain an output voltage at the tx_p 597 and at the tx_n 595 that is approximately equal to the voltage value of the $V_{CM}$ 899. For example, if the normal operating mode voltage for the $V_{CM}$ 899 is set to approximately 0.60V, the peak-to-peak differential output voltage may be approximately 0.80V and $V_{OH}$ 810−$V_{OL}$ 815=0.40V, thus giving the $V_{OH}$ 810 a high value of approximately 0.80V and giving the $V_{OL}$ 815 a low value of approximately 0.40V. That is, the tx_p 597 may be output at approximately 0.80V and at the tx_n 595 may be output at approximately 0.40V. Taking this example of the normal operating mode voltage for the $V_{CM}$ 899 (i.e., set to approximately 0.60V), but with respect to the sleep/slumber mode of operation, the tx_p 597 and the tx_n 595 may both be output at approximately 0.60V. In view of the exemplary embodiments of the I/O interface 130 and/or current-mode output driver 310 described above with respect to FIGS. 5-7 and Tables 1-3, the outputs tx_p 597 and the tx_n 595 may both be driven to a known voltage (e.g., the $V_{CM}$ 899) while most of the I/O interface 130 and/or current-mode output driver 310 circuits are powered off and/or disabled.

Figure 9A:
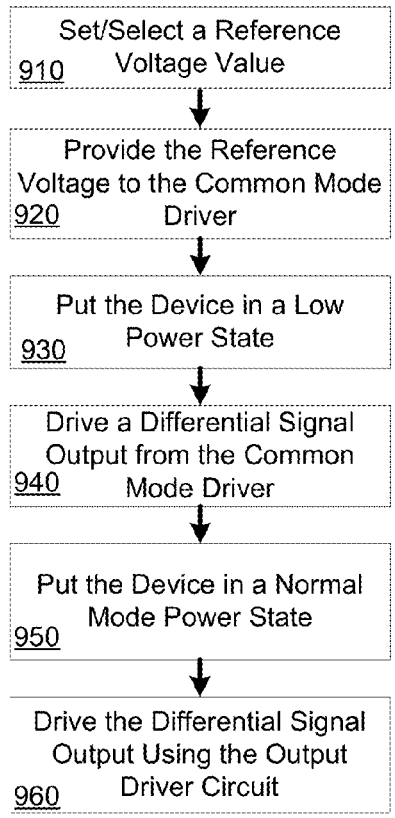
FIG. 9A illustrates a flowchart depicting operation of a circuit for a low-power wide-tuning range CML output driver, according to one exemplary embodiment.

Turning now to FIG. 9A, a flowchart depicting operation of a circuit for a low-power wide-tuning range current-mode logic ("CML") output driver is shown, in accordance with one or more embodiments. At 910, a reference voltage may be set to a desired value. In one embodiment, the reference voltage may be set/selected at a reference voltage circuit. At 920 the reference voltage may be provided to a common mode driver. At 930, the device may be put into a low power or sleep/slumber mode/state. At 940, a differential signal output may be driven from the common mode driver. In one embodiment, the differential signal may comprise two single-ended outputs. At 950, the device may be put in a normal power operational mode. In one embodiment, the normal mode may include powering any and/or all necessary device portions to allow for regular transmission of data. At 960, the differential signal output may be driven out on a differential pair output using an output driver circuit. In one embodiment, the differential signal that is driven out using the output driver circuit current may correspond to a received differential data signal 970.

Figure 9C:
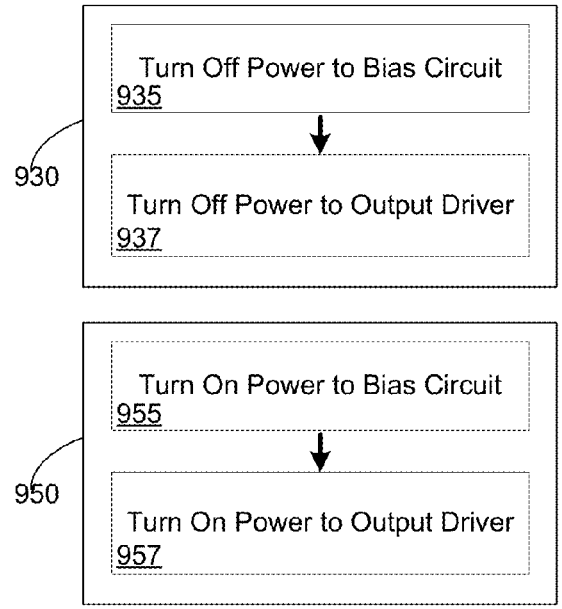
FIG. 9C illustrates a flowchart depicting a detailed representation of portions of FIG. 9A, according to one exemplary embodiment.
Figure 9B:
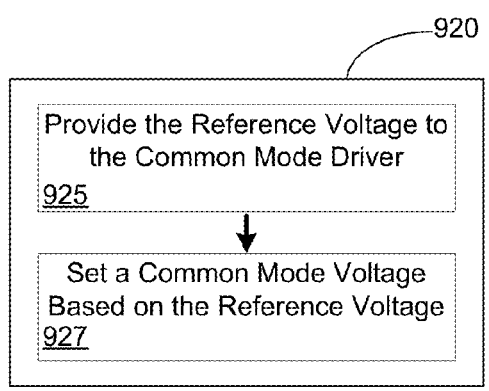
FIG. 9B illustrates a flowchart depicting a detailed representation of portions of FIG. 9A, according to one exemplary embodiment.

Turning now to FIG. 9B, a flowchart depicting operation of a circuit for a low-power wide-tuning range current-mode logic ("CML") output driver is shown, in accordance with one or more embodiments. FIG. 9B provides an exemplary detailed depiction of 920 from FIG. 9A. At 925, the reference voltage may be provided to the common mode driver. At 927, a common mode voltage may be determined or generated based on the reference voltage set in 925. In one embodiment, the reference voltage may be used by the common mode driver to provide and/or generate a common mode voltage.

Turning now to FIG. 9C, a flowchart depicting operation of a circuit for a low-power wide-tuning range current-mode logic ("CML") output driver is shown, in accordance with one or more embodiments. FIG. 9C provides an exemplary detailed depiction of 930 and 950 from FIG. 9A. At 935, the power to the bias circuit may be turned off, and at 937, the power to the output driver may be turned off. In one embodiment, turning off the power to the bias circuit and the output driver may include removing a power supply voltage from approximately all of the bias circuit and the output driver. At 955, the power to the bias circuit may be turned on, and at 937, the power to the output driver may be turned on. In one embodiment, turning on the power to the bias circuit and the output driver may include proving power to circuit such that it is in a normal power mode or a normal mode of operation.

Figure 9D:
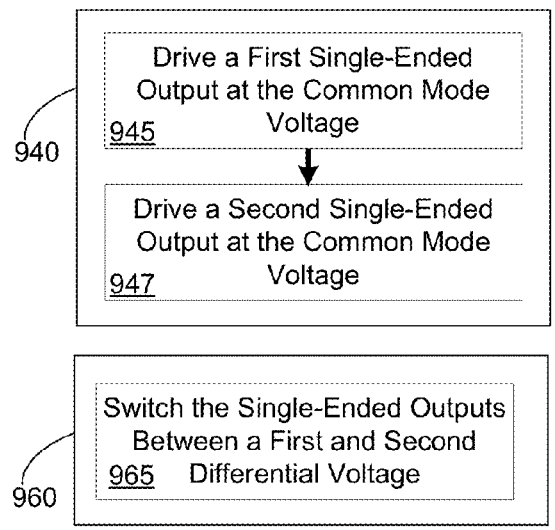
FIG. 9D illustrates a flowchart depicting a detailed representation of portions of FIG. 9A, according to one exemplary embodiment.

Turning now to FIG. 9D, a flowchart depicting operation of a circuit for a low-power wide-tuning range current-mode logic ("CML") output driver is shown, in accordance with one or more embodiments. FIG. 9D provides an exemplary detailed depiction of 940 and 960 from FIG. 9A. At 945, a first single-ended output signal may be driven out at a common mode voltage. At 947, a second single-ended output signal may be driven out at the common mode voltage. In one embodiment, the common mode voltage ($V_{CM}$) may be determined as:

$$V_{CM} = VDD - \tfrac{2}{3} \cdot (VDD - vref),$$

where VDD is the source power voltage VDD 605 and vref is the reference voltage vref_bias 512. Therefore, the vref_cm 513 may be determined as vref_cm=VDD−⅔·(VDD−vref_bias).

At 965, first and second single-ended inputs may be switched between a first and a second differential voltage. In one embodiment, the first and second differential voltages may be the $V_{OL}$ 815 or the $V_{OH}$ 810, as described herein with respect to FIG. 8. In one embodiment, if the first differential output voltage is the $V_{OL}$, the second differential voltage will be the $V_{OH}$. In another embodiment, if the first differential output voltage is the $V_{OH}$, the second differential voltage will be the $V_{OL}$. The single-ended output signals may be switched between the first and second differential voltages, for example, as shown in FIG. 8 and the accompanying description. It is noted that when one single-ended output signal is at a given differential voltage, the other single-ended output signal will be at the other differential voltage. During the switch between differential voltages, the single-ended output signal values will be equal at a $V_{CM}$ voltage (as described above with respect to FIG. 8).

Figure 10A:
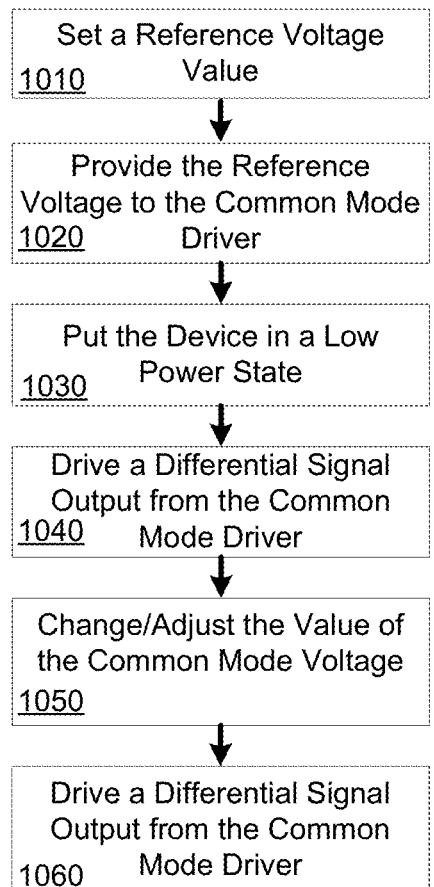
FIG. 10A illustrates a flowchart depicting operation of a circuit for a low-power wide-tuning range CML output driver, according to one exemplary embodiment.

Turning now to FIG. 10A, a flowchart depicting operation of a circuit for a low-power wide-tuning range current-mode logic ("CML") output driver is shown, in accordance with one or more embodiments. At 1010, a reference voltage may be set to a desired value. In one embodiment, the reference voltage may be set/selected at a reference voltage circuit. At 1020 the reference voltage may be provided to a common mode driver. In one embodiment, the common mode driver may set or generate a common mode voltage based on the reference voltage. At 1030, the device may be put into a low power or sleep/slumber mode/state. At 1040, a differential signal output may be driven from the common mode driver at the common mode voltage. In one embodiment, the differential signal may comprise two single-ended outputs. At 1050, the common mode voltage may be adjusted/tuned by a designer, manufacturer or user, or the common mode voltage may be automatically adjusted/tuned. At 1060, the differential signal output may be driven from the common mode driver using the changed common mode voltage. In one embodiment, the reference voltage may be changed in response to a low yield, circuit performance or PVT corners.

Figure 10B:
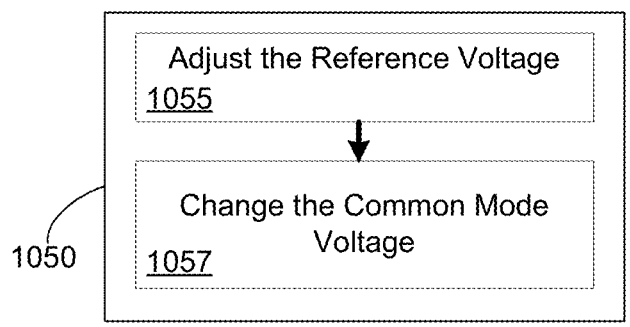
FIG. 10B illustrates a flowchart depicting a detailed representation of portions of FIG. 10A, according to one exemplary embodiment.

Turning now to FIG. 10B, a flowchart depicting operation of a circuit for a low-power wide-tuning range current-mode logic ("CML") output driver is shown, in accordance with one or more embodiments. FIG. 10B provides an exemplary detailed depiction of 1050 from FIG. 10A. At 1055, the reference voltage may be adjusted. In one embodiment, the reference voltage may be changed/adjusted at a reference voltage circuit. At 1057, the common mode voltage may be changed/adjusted based on the changed/adjusted reference voltage.

It is contemplated that the steps as shown in FIGS. 9A-10B are not limited to the order in which they are described above. In accordance with one or more embodiments, the steps shown in FIGS. 9A-10B may be performed sequentially, in parallel, or in alternate order(s) without departing from the spirit and scope of the embodiments presented herein.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and/or the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 155 (including embedded RAMs), compact discs, DVDs, solid state storage and/or the like). In one embodiment, the GDSII data (or other similar data) may be adapted to configure a manufacturing facility (e.g., through the use of mask works) to create devices capable of embodying various aspects described herein, in the instant application. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, silicon wafers containing I/O interfaces 130, current-mode logic drivers 310, common mode output driver circuits 520 and/or the like, may be created using the GDSII data (or other similar data).

It should also be noted that while various embodiments may be described in terms of SATA standards and serial I/O interfaces, it is contemplated that the embodiments described herein may have a wide range of applicability, not just for serial interfaces, as would be apparent to one of skill in the art having the benefit of this disclosure.

The particular embodiments disclosed above are illustrative only, as the embodiments of the instant application may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope of the claimed invention.

Accordingly, the protection sought herein is as set forth in the claims below.

What is claimed is:

1. A method, comprising:
   providing, at a data transmission device that includes a bias circuit, a common mode driver and an output driver circuit, a reference voltage to the common mode driver;
   putting the data transmission device in a low power state; and
   driving a differential signal pair output from the common mode driver based on the reference voltage during at least a portion of the low power state.

2. The method of claim 1, wherein the differential signal pair output comprises a first single-ended output signal and a second single-ended output signal, and wherein driving the differential signal pair output from the common mode driver comprises driving at a common mode voltage.

3. The method of claim 2, wherein driving at the common mode voltage occurs during a low power state, wherein the low power state includes disabling the bias circuit and the output driver circuit.

4. The method of claim 3, wherein the common mode voltage during the low power state is approximately equal to a common mode voltage of a normal operating state.

5. The method of claim 2, further comprising:
enabling the bias circuit and the output driver circuit; and
sending data from the output driver circuit using the differential signal pair by switching the first and second single-ended output signals between a first and a second differential voltage according to a differential signal operation.

6. The method of claim 2, wherein the common mode voltage is approximately equal to the reference voltage.

7. The method of claim 6, further comprising:
selecting a new reference voltage;
changing the common mode voltage by adjusting the reference voltage to the new reference voltage; and
driving the differential signal pair output from the common mode driver at the changed common mode voltage.

8. A device that comprises:
at least one common mode driver portion configured to drive an output signal at a common mode voltage during at least a portion of time when the device is in a low power state;
at least one data output driver portion configured to drive an output signal at a differential voltage level during at least a portion of time when the device is not in a low power state;
at least one bias circuit portion communicatively coupled to the at least one data output driver portion and to the reference voltage circuit;
at least one reference voltage circuit portion communicatively coupled to the at least one common mode driver portion and to the at least one data output driver portion;
an operating voltage node; and
a ground voltage node.

9. The device of claim 8, wherein the at least one common mode driver portion comprises a first pass-gate, a second pass-gate, and a differential amplifier; and
wherein the output of the differential amplifier is communicatively coupled to the first and the second pass-gates and to a first input of the differential amplifier, and wherein a second input of the differential amplifier is communicatively coupled to the reference voltage circuit.

10. The device of claim 9, wherein the reference voltage circuit is configured to output a reference voltage to the differential amplifier;
wherein the differential amplifier is configured to output the common mode voltage;
wherein the first and the second pass-gates are configured to drive an output signal at the common mode voltage; and
wherein the common mode voltage is approximately equal to the reference voltage.

11. The device of claim 10, wherein the reference voltage circuit is configured to perform at least one of:
providing the reference voltage at a plurality of voltage levels; or
providing the reference voltage at a voltage level where the voltage level is the operating voltage level minus two thirds of the difference between the operating voltage level and an operating bias reference voltage.

12. A non-transitory, computer readable storage device encoded with data that, when implemented in a manufacturing facility, adapts the manufacturing facility to create an apparatus, wherein the apparatus comprises:
at least one common mode driver portion configured to drive an output signal at a common mode voltage during at least a portion of time when the device is in a low power state;
at least one data output driver portion configured to drive an output signal at a differential voltage level during at least a portion of time when the device is not in a low power state;
at least one bias circuit portion communicatively coupled to the at least one data output driver portion and to the reference voltage circuit;
at least one reference voltage circuit portion communicatively coupled to the at least one common mode driver portion and to the at least one data output driver portion;
an operating voltage node; and
a ground voltage node.

13. A non-transitory, computer readable storage device, as set forth in claim 12, encoded with data that, when implemented in a manufacturing facility, adapts the manufacturing facility to create an apparatus, wherein the at least one common mode driver portion comprises a first pass-gate, a second pass-gate, and a differential amplifier; and
wherein the output of the differential amplifier is communicatively coupled to the first and the second pass-gates and to a first input of the differential amplifier, and wherein a second input of the differential amplifier is communicatively coupled to the reference voltage circuit.

14. A non-transitory, computer readable storage device, as set forth in claim 13, encoded with data that, when implemented in a manufacturing facility, adapts the manufacturing facility to create an apparatus, wherein the reference voltage circuit is configured to output a reference voltage to the differential amplifier;
wherein the differential amplifier is configured to output the common mode voltage;
wherein the first and the second pass-gates are configured to drive an output signal at the common mode voltage; and
wherein the common mode voltage is approximately equal to the reference voltage.

15. A non-transitory, computer readable storage device, as set forth in claim 13, encoded with data that, when implemented in a manufacturing facility, adapts the manufacturing facility to create an apparatus, wherein the reference voltage circuit is configured to perform at least one of:
providing the reference voltage at a plurality of voltage levels; or
providing the reference voltage at a voltage level where the voltage level is the operating voltage level minus two thirds of the difference between the operating voltage level and an operating bias reference voltage.

16. An apparatus, comprising:
at least one data output driver portion configured to drive a data output signal from the at least one data output driver portion at a first and a second differential voltage;
at least one common mode driver portion configured to drive a slumber output signal at a common mode voltage;
a reference voltage circuit communicatively coupled to the at least one common mode driver portion, wherein the reference voltage circuit is configured to provide a reference voltage to the at least one common mode driver; and wherein the apparatus is configured to enter a low power state and drive the sleep/slumber output signal from the at least one common mode driver portion at the common mode voltage.

17. The apparatus of claim 16, wherein the at least one data output driver portion and the at least one common mode driver portion each comprise a first single-ended output and a second single-ended output.

18. The apparatus of claim 16, wherein the low power state includes disabling the at least one data output driver circuit portion, and wherein the common mode voltage during the low power state is approximately equal to a common mode voltage of a normal operating state.

19. The apparatus of claim 18, wherein the reference voltage circuit portion is configured to change the common mode voltage; and wherein the common mode driver portion is configured to drive the sleep/slumber output signal at the changed common mode voltage.

\* \* \* \* \*